United States Patent [19]
Kurihara et al.

[11] Patent Number: 5,257,373
[45] Date of Patent: Oct. 26, 1993

[54] SYSTEM BY DETERMINING IF ALL MULTIPLE TASKS WERE PROCESSED NORMALLY

[75] Inventors: Kazumasa Kurihara; Shigeru Yajima, both of Higashimatsuyama, Japan

[73] Assignee: Zexel Corporation, Tokyo, Japan

[21] Appl. No.: 679,226

[22] Filed: Apr. 2, 1991

[30] Foreign Application Priority Data
Apr. 5, 1990 [JP] Japan .................................. 2-91169

[51] Int. Cl.$^5$ ............................................. G06F 11/30
[52] U.S. Cl. ....................... 395/650; 364/DIG. 1; 364/281.3; 364/280; 364/267.9; 364/267; 364/251.3
[58] Field of Search ................... 395/200, 575, 650

[56] References Cited
U.S. PATENT DOCUMENTS

| | | | |
|---|---|---|---|
| 4,323,966 | 4/1982 | Whiteside et al. | 395/575 |
| 4,356,546 | 10/1982 | Whiteside et al. | 395/575 |
| 4,805,107 | 2/1989 | Kieckhafr et al. | 395/650 |
| 4,816,989 | 3/1989 | Finn et al. | 395/200 |

Primary Examiner—Kevin A. Kriess
Attorney, Agent, or Firm—Pollock, Vande Sande & Priddy

[57] ABSTRACT

In a method for detecting malfunction in microcomputer system, in which a given job is processed in a multiple task processing manner, it is discriminated whether or not each of tasks was executed normally after the each execution thereof, and each count of counters provided for all of the tasks except for a prescribed task is changed in response to result of the discrimination. Each count of all counters is checked at the time of the execution of the prescribed task to determine whether or not all of the tasks were executed normally.

6 Claims, 2 Drawing Sheets

SYSTEM BY DETERMINING IF ALL MULTIPLE TASKS WERE PROCESSED NORMALLY

BACKGROUND OF THE INVENTION

1. Field of the Invention

The present invention relates to a method for detecting malfunction in microcomputer systems, and more particularly to a method for detecting malfunctions which may cause an abnormal operating state such as a system crash, system hang-up or the like during multiple task processing (multitasking) in a microcomputer system.

2. Description of the Prior Art

In the prior art, a watchdog timer has been widely employed in microcomputer systems for detecting malfunction or abnormal program execution likely to cause a system crash, system hang-up or the like. However, depending upon the circumstances, it is sometimes difficult by use of a watchdog timer to distinguish between normal and abnormal program execution since the conventional method using the watchdog timer detects abnormal program execution by controlling the generation of a reset pulse solely on the basis of whether or not a specific step in the program was executed. Accordingly, the conventional method requires additional complex hardware or the like for distinguishing more exactly between normal and abnormal program execution.

To overcome this drawback, Japanese Patent Application Public Disclosure No. Sho 58-154052 (154052/83) proposes a detecting method comprising steps of carrying out a predetermined arithmetic calculation each time a processing step appropriately selected from among a plurality of processing steps forming a desired program is executed, generating a pulse signal each time the arithmetic calculation produces a prescribed result, and discriminating whether or not an abnormal state has occurred in the execution of the program on the basis of the state of the pulse signal.

Recent microcomputer systems frequently employ multitasking, in which a job is divided into a plurality of tasks and programs for the respective tasks are activated at different times and run for different periods of time. However, in a multitasking system, since the programs for the respective tasks are activated by an interruption processing program, abnormal executions occurring in one or more of the programs for the tasks cannot be detected unless the abnormal execution or malfunction occurs in the program under the surveillance of a watchdog timer.

SUMMARY OF THE INVENTION

It is an object of the present invention to provide an improved method for detecting malfunction in microcomputer systems.

It is another object of the present invention to provide a detecting method capable of ensuring detection of malfunction in a microcomputer system which executes a program by multitasking.

According to the method of the present invention, in the case where a given job is divided into a plurality of tasks and the programs for these tasks hereinafter referred to as "task-programs" are executed in the manner of multitasking, a check is conducted to determine whether or not each of the task-programs is being normally executed. Data setting means are provided, for example, in all of the respective task-programs except for a prescribed task-program, and the content of each data setting means is changed in response to the execution condition of the associated task-program. At the time the prescribed task-program is executed, the contents of all of the data setting means are checked to determine whether or not all of the task-programs are being executed normally.

Each task-program is itself capable of discriminating whether or not it has been executed normally, and the contents of the associated data setting means is changed depending upon the result of this discriminating operation. The contents of all of the data setting means are checked at the time of the execution of the prescribed task-program.

The specifications of the individual task-programs such as their frequency of activation, activation timing and the like are known in advance. Therefore, by checking the changes in the contents of the data setting means it is possible based on the known specifications to discriminate whether or not the respective task-programs were normally executed. As a result, a double-checking operation is carried out to detect the abnormal execution of the task-programs with high reliability.

The invention will be better understood and other objects and advantages thereof will be more apparent from the following detailed description of preferred embodiments with reference to the accompanying drawings.

DESCRIPTION OF THE PREFERRED EMBODIMENT

Figure 1:
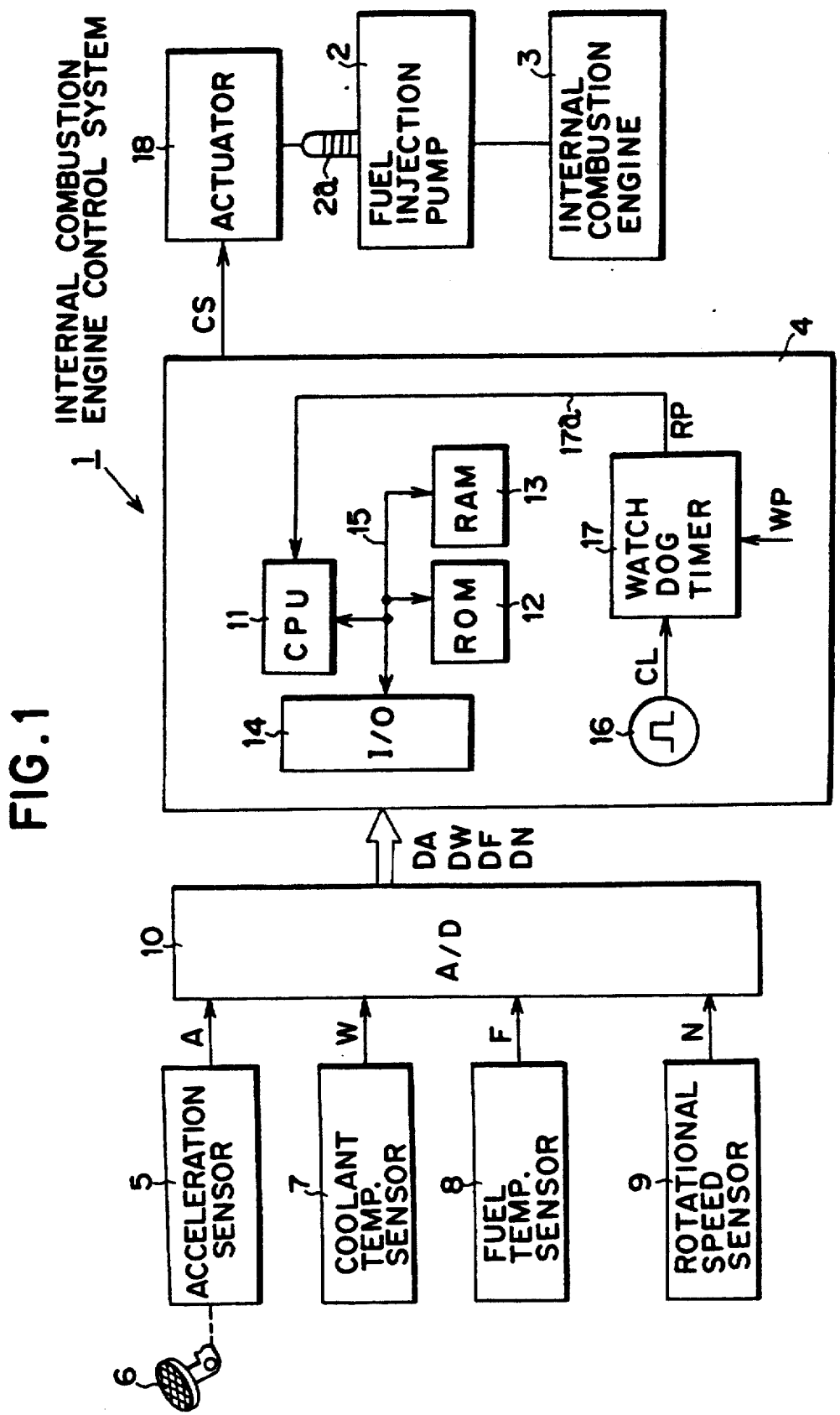
FIG. 1 is a view schematically showing an embodiment of an internal combustion engine control system for vehicles, in which the execution of a control program is checked in accordance with the method of the present invention.

FIG. 1 shows an internal combustion engine control system 1 for electronically controlling the operation of an internal combustion engine 3 to which fuel is injected from a fuel injection pump 2. The system 1 has a microcomputer 4. An acceleration sensor 5 is linked with an accelerator pedal 6 to produce an acceleration signal A showing the amount of the operation (depression) of the accelerator pedal 6, and a coolant temperature sensor 7 is for generating a coolant temperature signal W showing the temperature of the engine coolant. A fuel temperature sensor 8 generates a fuel temperature signal F indicating the temperature of fuel in the fuel tank (not shown), and a rotational speed sensor 9 generates a speed signal N showing the rotational speed of the internal combustion engine 3.

These signals A, W, F and N are sent to an analog-digital converter (A/D) 10 for conversion into digital form, and the corresponding digital data DA, DW, DF and DN obtained from the analog-digital converter 10 are input to the microcomputer 4 as data representing the operation parameters of the internal combustion engine 3.

The microcomputer 4 is of the conventional type comprising a central processing unit (CPU) 11, a read-only memory (ROM) 12, a random access memory (RAM) 13 and an input/output device (I/O) 14, which are interconnected by a bus 15. A control program 20 (explained below with reference to FIG. 2) for controlling the operation of the internal combustion engine 3 is stored in the ROM 12 and the control program is executed in the microcomputer 4 in the manner of multitasking.

As a result of the execution of the control program, a control signal CS is produced by the microcomputer 4 and applied to an actuator 18 for operating a fuel adjusting member 2a of the fuel injection pump 2, whereby the amount of fuel injected from the fuel injection pump 2 is controlled.

Figure 2:
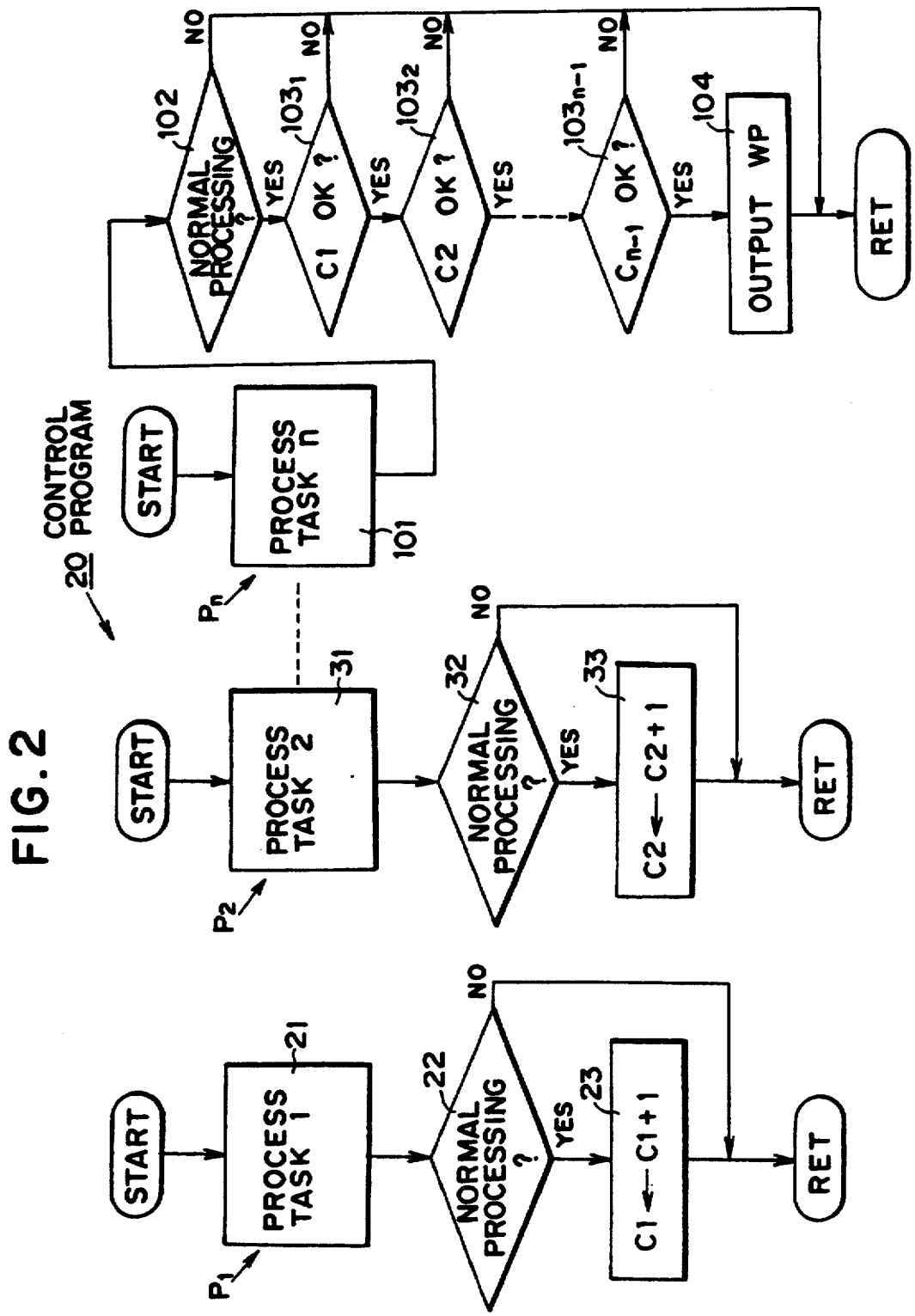
FIG. 2 is a flowchart showing the control program which is executed in a microcomputer installed in the control system of FIG. 1.

As shown in the flowchart of FIG. 2, the control program 20 is formed from n task-programs $P_1$ to $P_n$ for tasks 1 to n. The task-programs $P_1$ to $P_n$ are repeatedly executed each with its own activation cycle and activation timing, whereby the operation of the internal combustion engine 3 is controlled in accordance with the control program 20 executed in the manner of multitasking.

After the activation of the task-program $P_1$, the processing of the task 1 is first carried out in step 21 and the operation then moves to step 22 in which discrimination is made as to whether or not the program for carrying out the task 1 was normally executed in step 21. The conventional checking method may be used for the discrimination carried out in step 22, and the determination in step 22 is YES when the processing of the task 1 was normally carried out. As a result, in this case the operation moves to step 23, wherein the count of a counter C1 is increased by one, and the execution of the task-program $P_1$ is terminated. In this embodiment the counter C1 acts as a data setting means whose content is changed in accordance with the execution of the task-program $P_1$. On the other hand, the execution of the task-program $P_1$ is terminated without the performance of step 23 when the determination in step 22 is NO.

Accordingly, incrementation of the count of the counter C1 is carried out at the same time interval as that between consecutive activations of the task-program $P_1$.

The arrangement of the task-program $P_2$ for the task 2 is similar to that of the task-program $P_1$ for the task 1. Specifically, after the process for the task 2 is carried out in step 31, discrimination is made in step 32 as to whether or not the execution of the task-program $P_2$ was normally carried out. Then, the operation moves to step 33, wherein the count of a counter C2, which acts as a data setting means whose content is changed in accordance with the execution condition of the task-program $P_2$, is increased by one only when the program for processing the task 2 was carried out normally.

Thus, in this case the incrementation of the counter C2 is carried out at the same time interval as that of the execution of the task-program $P_2$.

The condition of execution of the task-programs $P_3$, $P_4$, ..., $P_{n-1}$ for the tasks 3, 4, ..., n-1 are similarly checked on the basis of whether or not the counts of the counters C3 to Cn-1 are incremented at the same time intervals as the activation intervals of the respective task-programs $P_3$ to $P_{n-1}$.

The task-program $P_n$ for the task n will now be described. After the program for processing the task n has been executed in step 101 in response to the activation of the task-program $P_n$, the operation moves to step 102, wherein discrimination is made as to whether or not the program for processing the task n was normally executed in step 101. The determination in step 102 becomes NO when it is determined in step 102 that the operation in step 101 was not carried out normally, and the execution of the task-program n is terminated.

On the other hand, the determination in step 102 becomes YES when the operation in step 101 was carried out normally, and the operation moves to step $103_1$, wherein the count of the counter C1 is checked on the basis of the relationship between the activation interval of the task-program $P_1$ and that of the task-program $P_n$. More specifically it is possible by, for example, a simple calculation to know in advance the value Kl of the counter C1 which should be obtained at the time of the execution of the task-program $P_n$ provided that the task-program $P_1$ was repeatedly executed normally at its prescribed activation interval. Thus, it is possible to know whether or not the task-program $P_1$ was executed normally by comparing the actual count of the counter C1 at that time with the value Kl.

It is determined in step $103_1$ that the task-program $P_1$ was executed normally when the actual count of the counter C1 is equal to the value Kl. In this case, the determination in step $103_1$ becomes YES and the operation moves to step $103_2$, wherein it is discriminated whether or not the count of the counter C2 at that time is equal to the expected value determined on the basis of the activation intervals of the task-programs $P_2$ and $P_n$, in the same manner as in step $103_1$.

The counts of the counters C3, C4, ..., Cn-1 of the task-programs $P_3$, $P_4$, ..., $P_{n-1}$ are similarly checked in the steps $103_3$ to $103_{n-1}$.

As will be understood from FIG. 2, step 104 is executed and a watchdog pulse WP is produced only when all of the counts obtained in the task-programs $P_1$ to $P_{n-1}$ are found to be the right values at the time of executing the task-program n. In contrast, step 104 is not executed when even one count among the counts of the counters C1 to Cn-1 is not equal to the corresponding predicted value. Accordingly, the watchdog pulse WP is not produced in this case.

As illustrated in FIG. 1, the watchdog pulse WP is applied as a reset pulse to a watchdog timer 17 of well known design constituted in the microcomputer 4. The watchdog timer 17 also receives a clock pulse train signal CL of a predetermined frequency from a clock pulse generator 16. The count of the watchdog timer 17 is incremented each time a pulse of the clock pulse train signal CL is applied thereto and is reset in response to the application of the watchdog pulse WP. Consequently, an overflow pulse appears as a system reset pulse RP on the output line 17a of the watchdog timer 17 in the case where the watchdog pulse WP is not supplied to the watchdog timer 17 before the count of the watchdog timer 17 has reached its overflow condition.

Since the watchdog timer 17 is designed in such a way that the time period from the time the watchdog timer 17 is reset to the time the count thereof reaches its overflow state is slightly longer than the time interval between consecutive generations of the watchdog pulse WP in the case where the control program executes normally, the system reset pulse RP is not produced so long as the control program executes normally. However, the system reset pulse RP is produced when the time interval between consecutive watchdog pulses WP is longer than the time period from the time of the reset to the time of the overflow of the watchdog timer 17 because of, for example, abnormal execution of the control program. The system reset pulse RP is applied to the CPU 11 to reset the same.

With the arrangement described above, each of the task programs $P_1$ to $P_n$ for processing the tasks 1 to n itself discriminates whether or not it has executed normally and depending on the result of the discrimination, either increments or does not increment the associated one of the counter C1 to Cn-1. Then, the counts of the counters C1 to Cn-1 are checked when the program for processing the task n is executed normally in the task-program $P_n$ and, based on the respective time activation intervals of the task-programs, it is discriminated whether or not each of the task-programs was properly executed.

Accordingly, the watchdog pulse WP is produced only when each of the tasks 1 to n was normally carried out and each of the task-programs $P_1$ to $P_n$ was repeatedly activated at the right time interval. In contrast, the watchdog pulse WP is not produced and the CPU 11 is reset when even one of the programs for processing the tasks 1 to n is not normally executed and or even one execution for the task-programs $P_1$ to $P_n$ is not activated at the right time interval.

Alternatively, various other conventional methods may be used for checking proper execution of the programs for processing the tasks 1 to n. For example, it is possible to use a detecting method in which the task to be checked is divided into a plurality of steps, a predetermined arithmetic calculation is carried out upon the completion of each step, and after all the steps have been executed, a discrimination is made as to whether or not the results of the arithmetic calculations are equal to the values which would be expected when the task is carried out normally.

According to the foregoing arrangement, in addition to checking whether or not each of tasks 1 to n was properly carried out, it is also checked on the basis of the time intervals for the repeated execution of the task-programs whether or not the task-programs $P_1$ to $P_n$ were properly executed. This double-checking system enables detection of whether or not the control program is executing normally to be carried out with high reliability.

What is claimed is:

1. A machine implemented method for detecting a malfunction in a microcomputer system, wherein a given job is divided into a plurality of tasks, and a plurality of task-programs for processing the tasks are executed in a multiple task processing manner, said method comprising the steps of:
    discriminating whether or not each processing of the tasks was executed normally after each execution thereof;
    changing the count of counter means provided for each of the task-programs except for a prescribed task-program by a prescribed value each time the processing of the corresponding task is determined to be normal in response to the result of said discriminating step; and,
    at the time of executing the prescribed task-program, checking a property of each count of all counter means on the basis of the activation interval for repeated execution of the task-programs to determine whether or not all of the corresponding tasks were processed normally.

2. A method as claimed in claim 1 further comprising a step of producing a watchdog pulse in response to the result of the checking step when it is confirmed that all of the tasks were processed normally.

3. A method as claimed in claim 1, wherein the prescribed task-program has a step of producing a watchdog pulse in response to the result of the checking step when it is confirmed that all of the tasks were processed normally.

4. A machine implemented method for detecting a malfunction in a microcomputer system for electronically controlling an operation of an internal combustion engine, wherein a given job for controlling the operation of the engine is divided into a plurality of tasks, and a plurality of task-programs for processing the tasks are executed in a multiple task processing manner, said method comprising the steps of:
    discriminating whether or not each processing of the tasks was executed normally after each execution thereof;
    changing the count of counter means provided for each of the task-programs except for a prescribed task-program in response to the result of said discriminating step; and,
    at the time of executing the prescribed task-program, checking a property of each count of all counter means on the basis of the activation interval for repeated execution of the task-programs to determine whether or not all of the corresponding tasks were processed normally when it is determined that the task in the prescribed task-program was processed normally.

5. A method as claimed in claim 4 further comprising a step of producing a watchdog pulse in response to the result of the checking step when it is confirmed that all of the tasks were processed normally.

6. A method as claimed in claim 4, wherein the prescribed task-program has a step of producing a watchdog pulse in response to the result of the checking step when it is confirmed that all of the tasks were processed normally.

* * * * *